United States Patent

[11] 3,608,963

| [72] | Inventor | Frank W. Steere, Jr.<br>Akron, Ohio |
| --- | --- | --- |
| [21] | Appl. No. | 825,614 |
| [22] | Filed | May 19, 1969 |
| [45] | Patented | Sept. 28, 1971 |
| [73] | Assignee | Steere Enterprises Inc.<br>Tallmadge, Ohio |

[54] BOOT
3 Claims, 12 Drawing Figs.

| [52] | U.S. Cl. | 297/385 |
| --- | --- | --- |
| [51] | Int. Cl. | A62b 35/60 |
| [50] | Field of Search | 297/385,<br>386, 387, 388, 389; 280/150 SB; 150/52 |

[56] References Cited
UNITED STATES PATENTS

| 2,932,334 | 4/1960 | Steen | 150/52 |
| --- | --- | --- | --- |
| 3,380,504 | 4/1968 | Green | 150/52 |
| 3,397,913 | 8/1968 | Fein | 297/385 |
| 3,436,097 | 4/1969 | Love | 280/150 SB |
| 3,437,349 | 4/1969 | Feles et al. | 280/15 CB |
| 3,512,631 | 5/1970 | Price et al. | 224/2 X |

*Primary Examiner*—James T. McCall
*Attorney*—Gordon C. Mack

ABSTRACT: Boots for seat belts which boots are slit from the top to the bottom so that they can be placed on a belt after it is attached to a vehicle.

3,608,963

INVENTOR.
FRANK W. STEERE, JR.
BY Gordon C. Mack
ATTORNEY

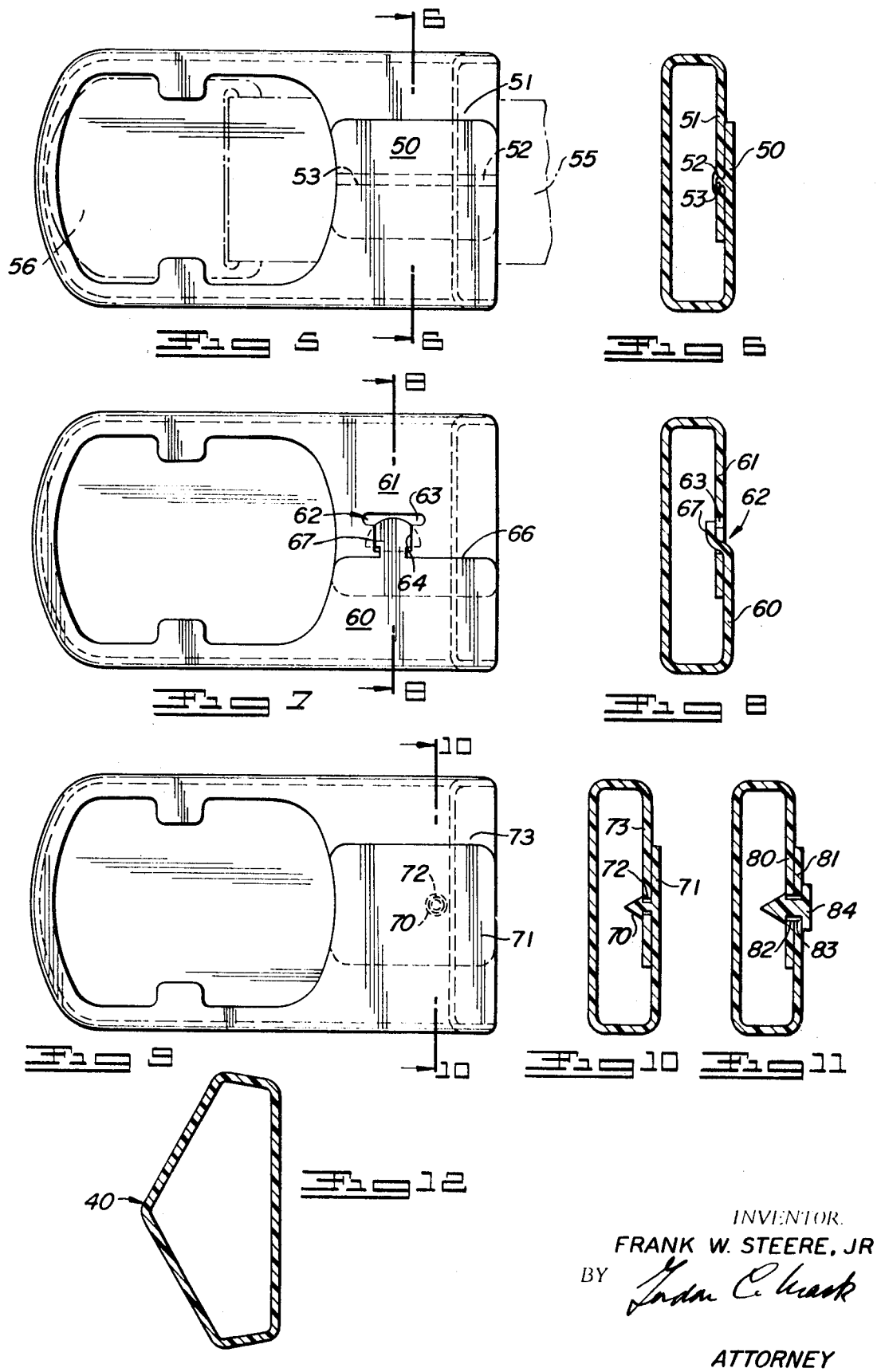

BOOT

This invention relates to a plastic boot for a seat belt that is open from the top to the bottom so that it can be placed over a seat belt after it is in position on an automobile or other vehicle.

Seat belts are provided with a terminal anchor plate which is fastened to a bolt or the like, usually located in the floor of the vehicle. The purpose of a boot is to cover the anchor plate and bolt or the like to which it is fastened, hiding it from view and protecting the portion of the seat belt adjacent the anchor plate.

There are various designs of boots for seat belts. All of the present boots must be assembled on a seat belt before the seat belt is fastened to a vehicle.

The necessity of assembling the boot on the belt before it is installed, increases the cost of installation. The boots are usually supplied to the belt manufacturer who assembles them on to seat belts and delivers the assembled belts and boots to the automobile manufacturer. Whether the assembly is made by the belt manufacturer or the automobile manufacturer, the boot is a nuisance to the man who fastens the belt to the automobile. It must be positioned on the belt away from the anchor plate to expose the anchor plate while the anchor plate is fastened to the automobile, and then this plate must be covered by the boot and the boot must be fastened to the bolt or otherwise fastened so that it remains in position. Boot designs have been improved to simplify this, but all designs which necessitate the boot being assembled on the belt before the belt is fastened to the automobile create a nuisance, and unnecessary labor costs.

The boot of this invention is preferably supplied directly to the automobile assembly line where it is fastened over the seat belt before or after the seat belt has been installed. If the boot be stiff, it is simply spread open and snapped in place around the seat belt. If the boot is not stiff enough to retain its position by itself, means—usually fastening means—is provided for causing it to retain its shape. The boot may be assembled above the anchor plate and then slid into position, or it may be assembled in its final position where it hides the anchor plate and the bolt or the like that holds the anchor plate to the automobile.

The boot is designed so that it retains its position around the belt. There are various means for doing this. The boot covers the top of the anchor plate and surrounds the adjoining portion of the belt. Usually it will cover little, if any, of the underside of the anchor plate. The boot, usually the underside (the backside) of the boot, is provided with an opening that extends from its top to its bottom, and more or less of the boot will be exposed through this opening. Sometimes the opening starts at the top side of the boot and extends around to the back.

Most boots are made by dipping a form into a plastisol. If the boot of this invention is made in this way, the opening that extends from the top to the bottom of the boot is easily made by slitting the boot, or by dieing out a portion of the boot. If the edges at the opening of the boot are to overlap, the boot will be made on a form of generally triangular cross section, and will later be opened at the apex of the triangle. Alternatively, the boot, if of flexible material, may be cut from a flat sheet.

The boot is usually made of plastic which is sufficiently resilient to prevent it from making a rattling noise, and at least stiff enough to permit draping over the anchor plate, etc. without wrinkling.

There are various ways in which the boot may be designed and/or constructed so that it maintains its position on the belt. It may be fastened to the belt or to the anchor plate or to the bolt that holds the anchor plate to the automobile. It may be made of a relatively stiff plastic so that when the sides adjacent the opening at the underside of the boot are spread and then released, they snap back into place around the belt. The plastic is preferably not so stiff as to prevent the bottom portion of the boot from readily shaping itself loosely over the anchor plate and bolt, without wrinkling.

If the boot is made from a softer plastic, i.e. a plastic that does not hold its shape sufficiently to stay in place by itself, means is provided at the opening to keep the edges from separating. A variety of means are available for this purpose, including buttons and buttonholes, snaps and a variety of other interlocking means only some of which are disclosed specifically herein.

Boots of several different designs are illustrated in the accompanying drawings.

In the drawings

FIG. 5 is a bottom view of a different boot;

FIG. 6 is a section on the line 6—6 of FIG. 5;

FIG. 7 is a bottom view of a different boot;

FIG. 8 is a section on the line 8—8 of FIG. 7;

FIG. 9 is a bottom view of a boot of still different design;

FIG. 10 is a section on the line 10—10 of FIG. 9;

FIG. 11 is a similar section through a boot with a different type of fastening; and FIG. 12 is a view of a section of the upper portion of a boot formed on a generally triangular form.

Figure 1:
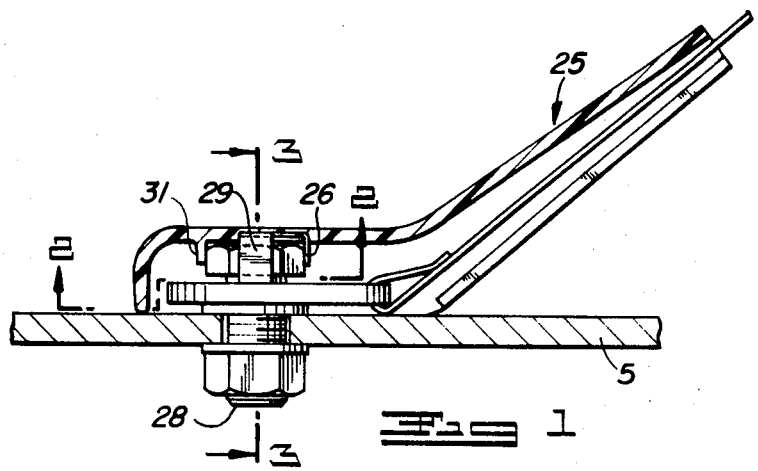
FIG. 1 is a sectional view through an assembly of a seat belt and boot in place.
Figure 2:
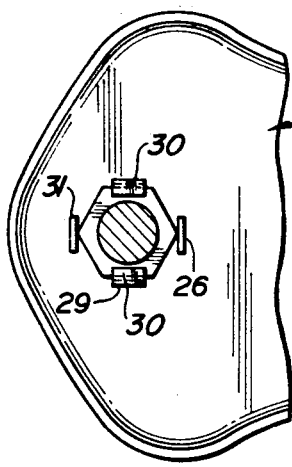
FIG. 2 is a section on the line 2—2 of FIG. 1.
Figure 3:
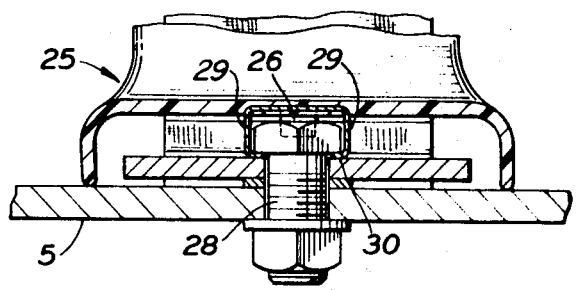
FIG. 3 is a section on the line 3—3 of FIG. 1.
Figure 4:
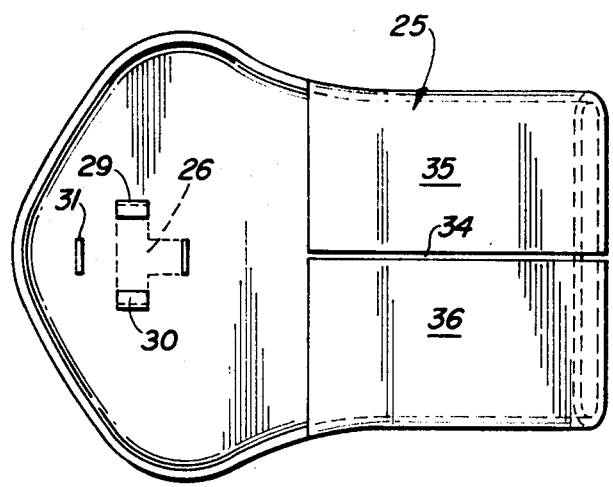
FIG. 4 is a bottom view of the boot shown in FIGS. 1–3.

In the boot 25 of FIGS. 1 to 4, a metal insert 26 is included in the boot when it is dipped. This covers three sides of the head of the bolt 28 which passes through the floor 5 of a vehicle. The opposite sides 29 are bent under to form flanges 30 (FIG. 2) which snap under the bolt head when the boot is pressed on to the the bolt head. The plastic projection 31 fits down over the other side of the bolt head.

The boot is of about the stiffness of the boots now employed. It is made on a form by dipping in a plastisol, and usually after removal from the plastisol it is fused and quenched at which time it can either be slit at 15 on the form or it can first be removed from the form and then slit.

Although the drawing shows but a single belt with an anchor plate fastened by the bolt 28, it is to be understood that two belts may be fastened in this manner.

This boot can readily be positioned around the seat belt after the boot has been fastened to the bolt head, or it may be positioned around the belt before the boot is fastened to the bolt. The head of the boot is pushed down onto the bolt head to engage it, and then before or after this the two back portions 35 and 36 of the boot are snapped around the belt.

The boots shown in FIGS. 1 to 4 are made of a composition such as is now employed in boot manufacture. The plastic is a vinyl composition and is relatively stiff so that the upper portion of the boot which surrounds the belt remains in place once the boot has been put in its final position. The present boots, of course, are not slit as applicant proposes to slit these boots, to provide an opening from the top to the bottom of the boot. The slits are formed after the dipping operation. Instead of merely slitting the backside of the boot, a substantial portion may be cutaway, if desired. The plastic is so stiff that after the back portions 35 and 36 are snapped in place, they remain in position, surrounding the belt near the anchor plate.

FIGS. 5 through 12 illustrate boots of a more flexible composition, such that the two back portions must be fastened together in some manner in order to keep them in the desired position. The portion of these boots above the large bottom opening, i.e. the portion which surrounds the belts, is made on a generally triangular form, and a section through this portion of these belts when taken from the form is shown in FIG. 12. Belts made on such forms and illustrated in FIGS. 5–6, 9–10 and 11 are slit at 40 to provide portions with straight edges which can be folded together in overlapping relation. The belt shown in FIGS. 7–8 is also made on such a form, but instead of merely slitting it, the edges must be fabricated.

The boots shown in FIGS. 5–11 are usually positioned on seat belts after the seat belts have been fastened to the floor of an automobile, but the boots are more flexible than those shown in FIGS. 1–4, and the backsides must be overlapped and fastened together. Ordinarily, some means is required to hold the boot in place over the anchor plate. The means shown in FIGS. 1–4 is illustrative but the invention is not limited thereto, as other means may be used.

Referring to FIGS. 5 and 6, it will be seen that the portion 50 overlaps the portion 51 at the back of the boot. A projection 52 on the overlapped portion 50 is provided. This projection extends the whole length of the portion 50. It may be formed by providing a groove in one side of the triangular form on which the boot is made, which groove is filled with the vinyl composition during the dipping operation. There is a cooperating indentation 53 in the overlapped portion 51. This is made by locating a suitably shaped rod closely adjacent to the boot dipping form but not in contact with the form in that portion which is to be dipped. The rod is positioned in relation to the form so that material may flow between the rod and the form as well as over the form and rod. On removal of the rod there is a completely separate hollow in flap 51 which is slit to form indentation 53 to match the projection on flap 50. This slit may be a mere knife cut, or a narrow strip of the plastic may be removed. Any suitable method of opening the hollow may be used.

A seat belt 55 and anchor plate 56 are shown in dot-dash lines in FIG. 5. These are fastened in place in the automobile in the same way as the belt illustrated in FIG. 1. Then the anchor plate is covered by the boot and the portions 50 and 51 are overlapped and the projection 53 is engaged in the groove 52 by the application of slight pressure. This is easily handled by the man on the automobile assembly line. This greatly simplifies the assembly of the boot. The boot can be readily removed by separating the overlapped portions 50 and 51.

The seat belts and their assembly are not shown in FIGS. 7–11, but it is understood that they are similar to what has been shown.

The structure shown in FIGS. 7 and 8 is quite satisfactory, but necessitates certain fabrication of the boot material. The back portions 60 and 61 are overlapped. There is an opening at 62 in the portion 61 which includes the elongated portion 63 connected with the rectangular portion 64. At the edge 66 of the overlapping portion 60 is the half moon extension 67. This is slipped through the elongated open portion 63 and then retracted in the usual manner to engage the tab 67 in the opening 62.

FIGS. 9 and 10 show a still further modification in which there is a relatively sharp projection 70 on the overlapping portion 71 which is formed during the dipping operation, and an opening 72 cut in the overlapped portion 73 which is of smaller diameter than the projection 70. The projection 70 is passed through the opening 72 to engage the two. This holds the overlapped portions of the back of the boot in position. There may be several projections 70 and openings 72 located across the width of the overlapping portions 71 and 73 of the boot to keep them in contact.

Instead of providing a projection on the portion 71 of the belt, FIG. 11 shows two overlapped portions 80 and 81 of the boot with coinciding openings 82 and 83 through which the pointed plug or button 84 is pressed to hold the overlapped portions together. There may be several such plugs in the overlapped portions.

The details of the design of the boot are immaterial so long as it is open from the top to the bottom. Usually this opening will be on the underside of the boot, but it may be at the edge of the boot or in any desired location.

The boot may be longer or shorter. It will usually extend from a position over the toe of the anchor plate, over the portion of the belt adjoining the anchor plate. The toe of the boot may extend over and under the toe of the anchor plate to assist in holding the boot in position, or means in the top of the boot may grasp the bolt, or other means may be utilized for keeping the boot in position.

I claim:

1. A plastic boot for a seat belt which belt is to be fastened to a vehicle through a terminal anchor plate, which boot comprises a lower portion to cover the anchor plate and an upper portion to surround and protect the portion of the belt adjacent the anchor plate, which upper portion is provided with an opening that extends from the top to the bottom thereof so that it may be located around the belt after the belt is fastened in a vehicle.

2. The boot of claim 1 which is stiff enough to be snapped into position about a seat belt.

3. A seat belt with a terminal anchor plate, the anchor plate being fastened to a portion of vehicle; and a boot over the anchor plate which boot comprises a portion which surrounds the belt and protects the portion of the belt adjacent the anchor plate, with an opening which extends from the top to the bottom of the boot so that it can be opened and positioned around the belt and then closed about it.